Oct. 24, 1950      N. L. SCOTT      2,527,083
SPRING GUIDE MEANS FOR PIPE LINING MACHINES
Filed Oct. 10, 1947
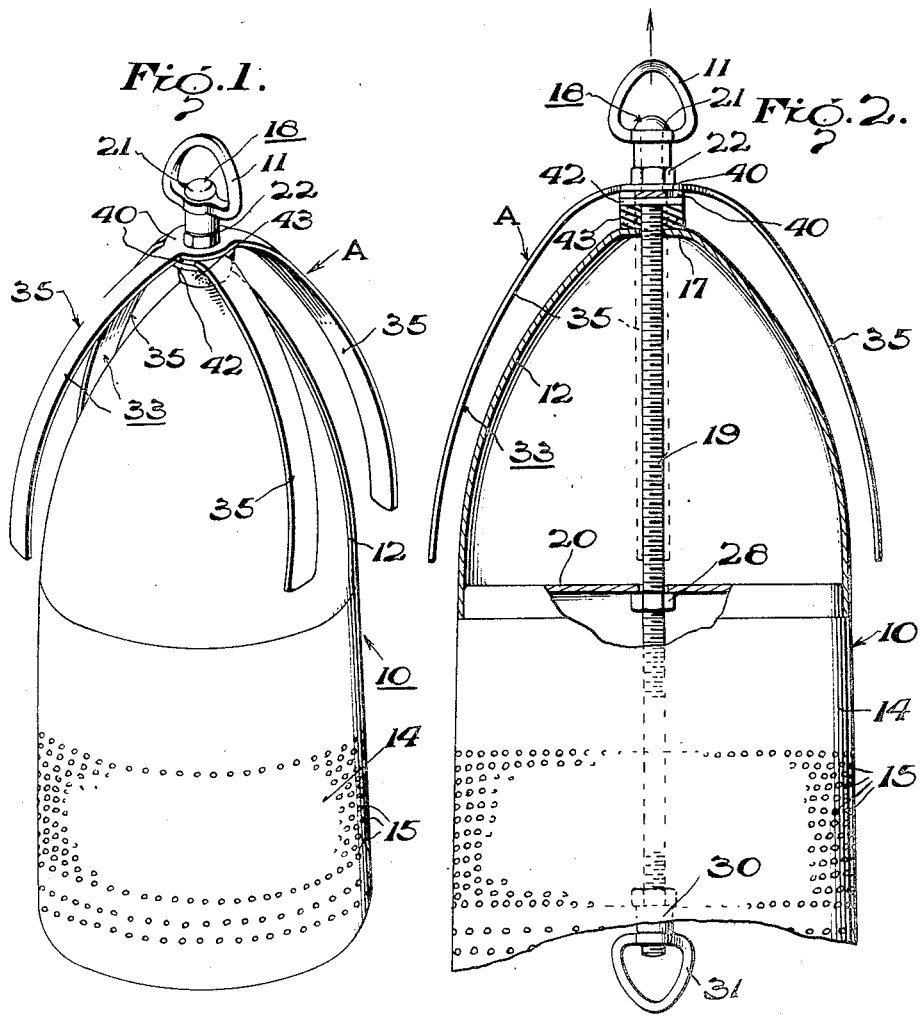
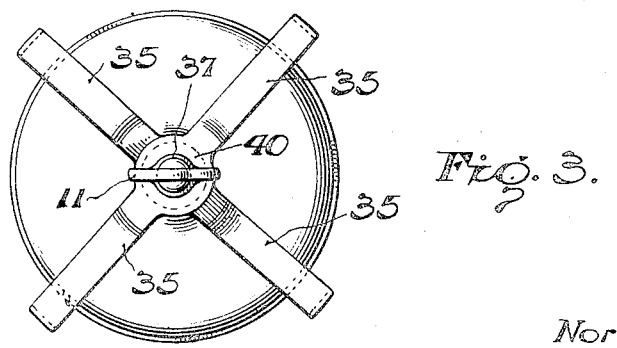
INVENTOR.
*Norman L. Scott.*
BY
*Herbert M. Birch*
Attorney Patented Oct. 24, 1950

2,527,083

UNITED STATES PATENT OFFICE 2,527,083

SPRING GUIDE MEANS FOR PIPE LINING MACHINES

Norman L. Scott, Andover, Mass., assignor, by mesne assignments, to Pipe Linings, Inc., New York, N. Y., a corporation of Delaware Application October 10, 1947, Serial No. 779,162

4 Claims. (Cl. 25—38)

The present invention relates to pipe lining apparatus and more particularly to such apparatus including a member for spreading lining material as it is pulled or propelled through a pipe to be lined.

In lining pipe with cementitious material by use of a conical nose spreader having a cement spreading skirt operatively coupled thereto, it is necessary to provide numerous guide means for centering the spreader in order to obtain a reasonably concentrically positioned lining within the pipe. Heretofore, centering means for such spreaders have been unsatisfactory, as they sometimes break regardless of how well they are tempered when any formidable obstruction in the pipe bore is encountered, or if they do not break they may bend and stay bent and allow the lining machine to get off center. Also, usually heretofore to provide for the best centering of the machine and to obtain sufficient bearing surface on the pipe walls, the nose thereof has been formed with an elongated extension and numerous guide fingers have been mounted or formed at intervals along the nose extension which makes a considerable extra overall length to the machine. With long nosed cable actuated lining machines, particularly during the lining of smaller size pipe lines which are not laid in a straight line, the cable pulling the liner machine will bear against one side of the pipe ahead of the liner and tend to pull the same over against the pipe wall. Such pull creates a strain on the nose guides positioned in the direction of pull with danger of breaking or bending them, and also a long nosed machine due to an off-center pull sometimes becomes stuck in the pipe. When the machine becomes stuck in the pipe, it is an expensive and time consuming job to release it.

Accordingly, an object of the present invention is to provide novel guide means for a cable actuated spreader machine, whereby a spreader machine is maintained centered in the pipe bore regardless of off-center pulls on the draw cable caused by crooked pipe lines.

Another object is to provide a novel guide spring for cable drawn pipe lining spreader machines shaped and formed to thereby materially shorten the overall length of the machine, whereby the machine is more efficient in action during the lining of pipe lines containing small obstructions, slight bends and underground pipe lines not laid straight.

A further object is to provide in combination with a spreader machine of a particular size, novel arcuate flat guide springs having arcs of predetermined radii for the particular size of spreader, to thereby allow for the most extensive bearing surface contact with the interior walls of a known diameter pipe to be lined, whereby superior centering of the machine and truer lining is formed in the pipe regardless of off-center pull on the draw cable caused by small pipe obstructions, crooked pipe lines or the like.

A still further object is to provide a spreader machine for lining pipe with a cementitious mixture having a single set of flat yieldable centering guide springs, whereby pipe lining spreader machines are made more economical to manufacture and more durable and efficient in action than prior machines of this type using a long nose with a plurality of sets of guide fingers.

With these and other objects in view which will become apparent as the invention is fully understood, the same resides in the novelty of construction, combination and arrangement of elements hereinafter specifically described and distinctly defined in the appended claims.

In the drawings, wherein like reference characters refer to like parts throughout the several views, Figure 1 shows a spreading machine with the novel guide springs mounted over the nose thereof in operable position.

Figure 2 is a partial cross section view of the nose of the spreader machine to better illustrate the mounting of the novel guide means.

Figure 3 is a plan view looking down on the nose of the machine.

Referring to the drawing in detail, and with particular reference to Figure 1, there is shown a spreader machine 10 adapted to be dragged by a cable, not shown, connected to a coupling ring 11 as is well known in the art. This spreader 10 is formed with a conically rounded or tapered hollow nose 12 connected to a tapered trailing skirt 14 formed with a plurality of dehydrating openings 15. The skirt 14 may be detachably connected to the nose by any suitable means, for example, by a spindle or bolt 18, as shown in Figure 2. The coupling ring 11 is centrally and turnably mounted on the spindle or bolt 18 extending through a flat tip surface 17 of the spreader nose 12 and into the hollow skirt 14.

The flat tip surface 17 is formed with an opening for the threaded shank 19 of the bolt 18 to extend through into an opening formed in the closed top end 20 of the attached skirt 14. This surface 17 serves as a seat for certain parts adapted to mount and space the novel resilient guide means A of the present invention hereinafter to be described.

The novel guide means A is in the form of a resilient spider member comprised of wide flat surfaced steel springs 33 made from well tempered flat steel strips. These strips are wide to provide large transverse bearing surfaces and are specially made by bending them into a bow, so as to form arcuate arms 35 resiliently yieldable from the intermediate center point of the bow. Each arcuate arm is formed into an arc of predetermined radius with respect to the sizes of the pipe to be lined and the lining machine to be used. For example, the radii of arms 35 is plotted, so as to form arcuate guides with radii larger than the radius of the bore of a known diameter pipe line to be treated, whereby a predetermined tension on the spring arms 35 and the most effective bearing surface of the guides on the pipe line wall is developed as the machine is pulled forward during the lining operation. Assuming, for example, the pipe line is 12 inches in diameter, then the arcuate arms 35 are made with radii based on a diameter of 1¼ inches over that of the interior bore of the pipe line.

The central point of each bow is formed with an opening 37 to accommodate the mounting bolt or spindle 18 previously described. Each guide means A preferably comprises at least two bow formations crossed at substantially right angles to each other to provide a plurality of the arcuate arms 35, which when mounted on the boss or surface 17 of the nose 12 extend rearwardly over the nose toward the hollow dehydrator skirt 14.

It is important that these bow formations are secured together to provide a strong unitary spider when assembled. To produce such a strong unitary spider assembly, each bow is preferably centrally enlarged around the opening 37 to form a flat disk 40, and the bows are then crossed at right angles to each other and secured together by welding or the like and retempered to further strengthen the spring arms 35.

Prior to or after the retempering of the formed guide springs to their final shape, there may be secured to one of the enlarged central parts of the bow formations, by welding, forging or the like, a flat disk 42 formed with a central opening for alignment with the center openings of the bows. When this final disk 42 has been integrally combined with the enlarged center portions of the bow formations, there is provided a strong base portion for centrally anchoring the resilient yielding arcuate guide arms 35. This base may seat directly upon the nose boss 17 or it may seat upon the top of a spacer shim 43, if more space is required between the nose boss and the arcuate flat spring arms 35.

In assembling the guide means A, nose 12, and the coupling ring 11 is positioned against the head 21 of the bolt 18 and a nut 22 threaded up against the ring to hold it in place. After this the bolt is inserted through an opening formed in the center disk 42 of guide means A, and when needed, through the centrally apertured spacer member, such as a shim or washer 43. The assembly thus far is seated on the boss or surface 17 of the nose, so that the shank 19 extends through the hollow nose 12 and the opening formed in the closed end 20 of the hollow dehydrating skirt 14. The end of the bolt 18 extends almost to the trailing end of the skirt 14 and a nut 28 is then threaded onto the shank 19 tightly against the trailing side of the skirt top 20, whereby the entire assembly mounted on the boss or nose surface 17 is secured in place. Then in the skirt end of the machine the end of shank 19 has threaded thereon a cap nut 30 carrying another coupling ring 31, so that the machine can be pulled back slightly, if desired.

Thus with the development of the novel extended bearing area guide means of the present invention, spreader machines may be made of shorter overall length and the centering action of the machines is greatly improved and superior to prior guides, which prior guides are not efficient in lining pipe with small obstructions therein or in lining pipe lines which are not laid straight. Also, with such a reduction in the length of these machines combined with the provision of guides with both extensive transverse and longitudinal pipe wall bearing surfaces, a substantial reduction in breakdowns and in the danger of the lining machines becoming jammed in the pipe line results. Reduction in such breakdowns and jammed machines results in a yearly saving of thousands of dollars both from the standpoint of labor and replacement of expensive broken machinery.

Without further description the operation and use of the novel guide means should be clear, and although only one embodiment of the invention has been illustrated and described in detail, it is to be expressly understood that the invention is not limited thereto. Also, various changes may be made in the design, arrangement and combination of parts without departing from the spirit and scope of the invention, as will now likely occur to others skilled in the art. For a definition of the limits of the invention, reference should be had to the appended claims.

What is claimed is:

1. Guide means for use with pipe lining machines formed with a nose and dehydrating skirt portion, said means comprising flat arcuate strips of tempered spring steel formed into bows of a width materially greater than the thickness thereof, said bows being crossed at right angles to each other, and a boss with a central opening formed at the central crossing point of the bows anchored thereto as by welding to serve as a mounting for the guide means on the nose of the lining machine.

2. Guide means for use with pipe lining machines of the class described, said means comprising flat arcuate strips of tempered spring steel formed into bows of a width materially greater than the thickness thereof, said bows being crossed at right angles to each other, an enlarged central area between the ends of each bow, and a mounting disk to which said areas are secured to form a unitary guide structure with extensive transverse bearing surfaces.

3. In a mortar spreading machine for lining pipe employing a spreader having a leading nose portion, said nose having a tip portion and being tapered from its tip to its trailing end and a tapered skirt coupled thereto, a centering guide unit for said spreader comprising guide members formed of wide flat spring steel bars of a width materially greater than the thickness thereof formed into bows mounted at right angles to each other, each of the bows being formed with a flat top portion formed with central openings, said flat portions being secured together a flat circular bow mounting disc with a central opening securely joined to one of said flat portions, a spindle extending from inside the said machine through said openings, a separable flat surfaced spacer shim seated on said nose tip on said spindle, and means threadable on the spindle for securing the said spacer shim between the opposed flat surfaces of the nose tip and said circular bow mounting plate.

4. In a cementitious material spreading machine for lining pipe employing a drag spreader having a leading front tapered portion, and a rearwardly flaring dehydrating skirt coupled thereto, a centering guide unit for said spreader comprising yieldable members formed of flat tempered steel of a width materially greater than the thickness thereof so formed and so proportioned in cooperation with the said nose portion as to maintain a constant bearing surface area of an extensive portion of the said yieldable members with the wall of a pipe being lined, whereby off-center pulls on said drag-spreader are compensated for and resisted by said extensive bearing surface area.

NORMAN L. SCOTT.

REFERENCES CITED

The following references are of record in the file of this patent:

UNITED STATES PATENTS

| Number | Name | Date |
|---|---|---|
| 1,951,221 | Tate | Mar. 13, 1934 |
| 2,026,470 | Haskins et al. | Dec. 31, 1935 |
| 2,293,365 | Scott | Aug. 18, 1942 |
| 2,369,719 | Crane | Feb. 20, 1945 |
| 2,377,615 | Crane | June 5, 1945 |